United States Patent [19]
Nakano

[11] Patent Number: 5,984,826
[45] Date of Patent: Nov. 16, 1999

[54] TOROIDAL CONTINUOUSLY VARIABLE TRANSMISSION FOR PREVENTING THE LOOSENING OF A LOADING NUT

[75] Inventor: Masaki Nakano, Yokohama, Japan

[73] Assignee: Nissan Motor Co., Ltd., Yokohama, Japan

[21] Appl. No.: 09/011,059

[22] PCT Filed: Jul. 14, 1997

[86] PCT No.: PCT/JP97/02432

§ 371 Date: Feb. 4, 1998

§ 102(e) Date: Feb. 4, 1998

[87] PCT Pub. No.: WO98/02676

PCT Pub. Date: Jan. 22, 1998

[30] Foreign Application Priority Data

Jul. 21, 1996 [JP] Japan .................................. 8-186066

[51] Int. Cl.⁶ .................................................. F16H 15/38
[52] U.S. Cl. .............................................. 476/45; 476/41
[58] Field of Search ................................ 476/40, 41, 42, 476/43, 45, 48; 411/368, 546

[56] References Cited

U.S. PATENT DOCUMENTS

| | | | |
|---|---|---|---|
| 4,717,299 | 1/1988 | Underwood | 411/11 |
| 4,893,517 | 1/1990 | Nakano | 74/200 |
| 5,027,669 | 7/1991 | Nakano | 74/200 |
| 5,651,750 | 7/1997 | Imanishi et al. | 476/40 |
| 5,676,618 | 10/1997 | Nakano et al. | 476/10 |

FOREIGN PATENT DOCUMENTS 4-69439  3/1992  Japan .

*Primary Examiner*—Tamara L. Graysay
*Assistant Examiner*—David Fenstermacher
*Attorney, Agent, or Firm*—Foley & Lardner

[57] ABSTRACT

A toroidal continuously variable transmission comprises a main shaft having a step section. An input disc is drivably supported on the main shaft and axially movable along the axis of the main shaft. An output disc is rotatably supported on the main shaft and located facing the input disc. A power roller is disposed between and in frictional engagement with the input disc and the output disc so as to make transmission of power from the input disc to the output disc. Belleville springs (each having a center opening) are disposed around the main shaft and located at an opposite side of the input disc with respect to the output disc so as to press the input disc toward the output disc. A loading nut is screwed on the main shaft to restrict an expansion amount of the Belleville springs. The loading nut axially faces the step section of the main shaft. A sleeve is disposed between the loading nut and the step section of the main shaft. The sleeve is separable from the loading nut. The Belleville springs are mounted on the sleeve in a manner that the sleeve passes through the central opening of each Belleville spring.

13 Claims, 4 Drawing Sheets

TOROIDAL CONTINUOUSLY VARIABLE TRANSMISSION FOR PREVENTING THE LOOSENING OF A LOADING NUT

TECHNICAL FIELD

This invention relates to improvements in a toroidal continuously variable transmission, and more particularly to the improvements around a loading nut for restricting the contraction amount of belleville springs in order to effectively prevent the loading nut from being loosened thereby enhancing frictional contact of input and output discs against a power roller.

BACKGROUND ART

In a toroidal continuously variable transmission, input and output discs are disposed on a main shaft, and a power roller is disposed between and in frictional engagement with the input and output discs. The input disc is fixedly mounted through ball splines on the main shaft. Belleville springs are usually disposed at an opposite side of the input disc with respect to the output disc to apply a pre-load to the input disc in order that the input and output discs are in frictional contact with the power roller at a suitable pressure. It is usual that the axial contraction amount of the belleville springs are restricted by a loading nut which is screwed on the main shaft and fixed at a position near a step section of the main shaft. Such a toroidal continuously variable transmission is disclosed, for example, in Japanese Patent Provisional Publication No. 4-69439.

However, drawbacks have been encountered in the above conventional toroidal continuously variable transmission, as discussed below. That is, the toroidal continuously variable transmission of this type is arranged such that rotation of a cam flange connected to an input shaft is-transmitted through a loading cam mechanism to the input disc, and then the rotational power of the input disc is further transmitted through the power roller to the output disc. Particularly in case that the transmission is of the double cavity type, the loading nut screwed and fixed on the main shaft is higher in rigidity (or spring constant) and difficult to have a sufficient axial length of its internal threaded portion from the viewpoint of construction of the transmission. Additionally, it is also difficult that the length of an abutting end section (contactable with the main shaft step section) of the loading nut is sufficiently large to compensate the tightening force of the loading nut. Under such a situation, when relative rotation (in an amount corresponding to play of each ball spline in the rotational direction) is made between the input disc and the loading nut while the main shaft elongates owing to a thrust under a large input torque change, the tip end of the abutting end section of the loading nut separates from the step section and therefore there is the fear of the loading nut being loosened.

Additionally, during operation of the above conventional transmission, the belleville springs make their axial sliding movement and axial contraction on the cylindrical section of the loading nut, in which the cylindrical section is subjected to a large amount of wear owing to sliding contact between it and the belleville springs. In view of this, the peripheral surface portion of the cylindrical section of the loading nut has been usually hardened, for example, by carburizing. In making such a hardening processing to the loading nut, it is necessary to make a precise control in order to avoid a strength degradation (depending on hardening) of the internal thread portion of the loading nut, thereby complicating the production process of the loading nut.

DISCLOSURE OF INVENTION

It is an object of the present invention to provide an improved toroidal continuously variable transmission which can effectively overcome drawbacks encountered in conventional toroidal continuously variable transmissions.

Another object of the present invention is to provide an improved toroidal continuously variable transmission which can effectively prevent a loading nut for restricting the axial contraction amount of belleville springs, from being loosened even upon a large torque change is applied to the main shaft, thereby enhancing frictional engagement of input and output discs with a power roller.

A toroidal continuously variable transmission according to the present invention comprises a main shaft having a step section. An input disc is drivably supported on the main shaft and movable axially along an axis of the main shaft. An output disc is rotatably supported on the main shaft and located facing the input disc. A power roller is disposed between and in frictional engagement with the input disc and the output disc so as to make transmission of power from the input disc to the output disc. Belleville springs (each having a center opening) are disposed around the main shaft and located at an opposite side of the input disc with respect to the output disc so as to press the input disc toward the output disc. A loading nut is screwed on the main shaft to restrict a contraction amount of the Belleville springs. The loading nut axially faces the step section of the main shaft. A sleeve is disposed between the loading nut and the step section of the main shaft. The sleeve is separable from the loading nut. The belleville springs are mounted on the sleeve in a manner that the sleeve passes through the central opening of each Belleville spring.

By virtue of the sleeve disposed between the step section of the main shaft and the loading nut under the contracted state so as to provide and compensate the pressure of the loading nut against the step section of the main shaft, a sufficient large distance for providing the pressure against the main shaft step section can be secured. Additionally, the cross-sectional area of the sleeve can be made smaller than that of a part of the main shaft between the step section and the loading nut. As a result, the rigidity (or spring constant) of the sleeve is considerably lowered relative to that of the abutting end section of the loading nut of the conventional transmission, so that the sleeve can be set in position in the contracted state under the action of a compressive force applied from the loading nut. Accordingly, if the main shaft of the transmission of the present invention makes its elastic deformation and elongates upon receiving a large torque change during operation of the transmission, the sleeve in the contracted state makes its axial restoration so that no space is produced between the step section of the main shaft and the sleeve to maintain a suitable pressure of the sleeve against the annular flat surface of the main shaft step section. Thus, the loading nut can be effectively prevented from being loosened.

Additionally, by virtue of the fact that the sleeve is a separate member from the loading nut, it is sufficient during a production process to make a hardening treatment only on the sleeve without making the hardening treatment on the loading nut. This simplifies the production process of a loading unit including the loading nut and the sleeve. Additionally, the internal thread portion of the loading nut can be axially deeply inserted inside the cylindrical section of the sleeve so as to increase the axial dimension thereof, thus further preventing the loading nut from being loosened.

BEST MODE FOR CARRYING OUT THE INVENTION

Figure 1:
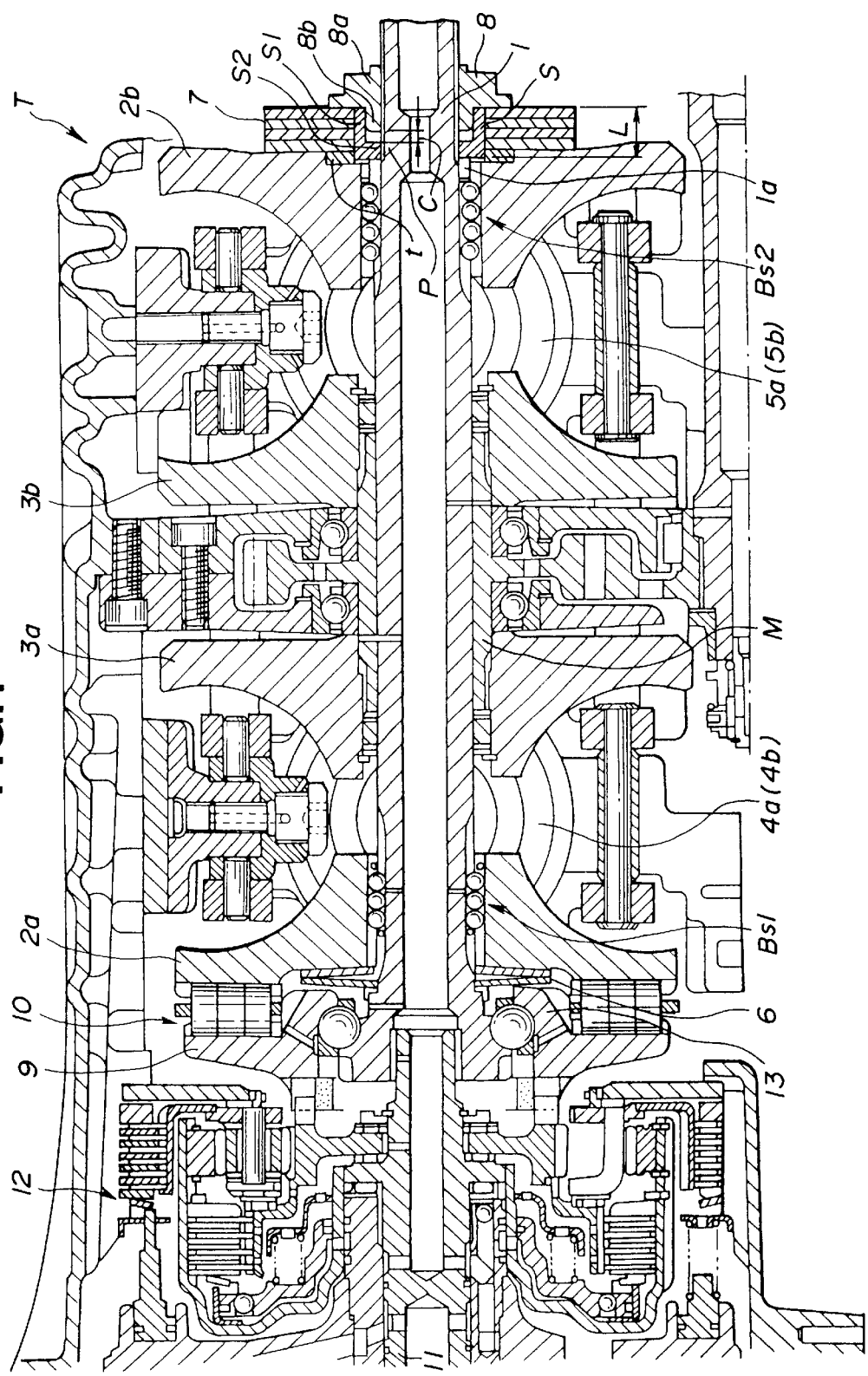
FIG. 1 is a fragmentary longitudinal sectional view of an embodiment of a toroidal continuously variable transmission according to the present invention.

Referring now to FIG. 1, an embodiment of a double cavity type toroidal continuously variable transmission according to the present invention is illustrated by the reference character T. The transmission comprises a main shaft 1. Input discs 2a, 2b are mounted on the main shaft 1 respectively through ball splines Bs1, Bs2 in such a manner that transmission of power can be made from the main shaft 1 to each input disc. Output discs 3a, 3b are respectively located facing the input discs 2a, 2b and rotatably mounted on the main shaft 1. The output discs 3a, 3b are drivingly connected to an output sleeve M in a manner to transmit power to the output sleeve M. Power or friction rollers 4a, 4b are provided in such a manner that each power roller is disposed between the input disc 2a, 2b and the output disc 3a, 3b to make transmission of power from the input disc to the output disc. Other power or friction rollers 5a, 5b are provided to be located such that the power rollers 4a, 4b (or 5a, 5b) are generally symmetrical with respect to the main shaft 1, though not shown.

Belleville springs 6 are disposed around the main shaft 1 to push the input disc 2a toward the output disc 3a so as to apply a pre-load to the input disc 2a. Belleville springs 7 are also disposed around the main shaft 1 to push the input disc 2b toward the output disc 3b so as to apply a pre-load to the input disc 2b. Each of belleville springs 6, 7 is formed with a central opening (not identified) inside which the main shaft 1 passes. A loading nut 8 formed of steel is screwed on the main shaft 1 and located such that the belleville springs 7 are disposed between it and the input disc 2b. The loading nut 8 functions to restrict an axial contraction amount of the belleville springs 7. The axial contraction amount of the belleville springs 7 is adjustable by a spacer t disposed in a groove of the input disc 2b and in contact with the belleville springs 7. The loading nut 8 includes a main body section 8a to which a cylindrical projection 8b is integral. The cylindrical projection 8b projects axially from the main body section 8b toward the input disc 2b. The loading nut 8 is formed with an internal thread portion (no numeral) engaged with the external thread portion (no numeral) of the main shaft 1. The internal thread portion of the loading nut extends throughout the main body section 8a and the cylindrical projection 8b. The main body section 8a has an annular flat face (no numeral) to which the belleville springs 7 are contacted, the annular flat face being perpendicular to the axis of the main shaft 1. The cylindrical peripheral surface of the cylindrical projection 8b is perpendicular to the annular flat face of the main body section 8a.

An annular thin sleeve S formed of steel is disposed between a step section 1a of the main shaft 1 and the loading nut 8. The step section 1a is located radially inward of the input disc 2b and has an annular flat face (not identified) perpendicular to the axis of the main shaft 1. The sleeve S includes a cylindrical section S1 coaxial with the main shaft 1 and tightly fitted on the cylindrical projection 8b of the loading nut 8. An end portion of the cylindrical section S1 of the sleeve S is in contact with the annular flat face of the main body section 8a of the loading nut 8. The tip end of the cylindrical projection 8b of the loading nut 8 is located axially separate from the tip end of the cylindrical section S1 of the sleeve S so as to approach the step section 1a of the main shaft 1. In other words, the tip end of the cylindrical projection 8b is located at the axially central part of the inside of the cylindrical section S1 of the sleeve S. The sleeve S includes an annular flange section S2 which is integral with the other end portion of the cylindrical section S1. The annular flange section S2 is mounted on the peripheral surface of the main shaft 1. The annular flange section S2 has an annular flat face (no numeral) which is perpendicular to the axis of the main shaft 1 and in contact with the annular flat face of the step section 1a. As shown, the belleville springs 7 are mounted on the cylindrical section S1 of the sleeve S. The tip end of the cylindrical projection 8b of the loading nut 8 is separate from the flange section S2 of the sleeve S to form therebetween an annular space C. Thus, the sleeve S is pressed against the step section 1a of the main shaft 1 under an axial force due to screwing of the loading nut 8 in order to provide and compensate a pressure of the loading nut 8 against the step section 1a.

In this embodiment, the axial length L of the sleeve S is larger than the axial length of a part P of the main shaft 1 between the annular flat face of the step section 1a and the tip end of the cylindrical projection 8b of the loading nut 8. Additionally, the cross-sectional area of the cylindrical section S1 of the sleeve S is smaller than that of the part P of the main shaft 1, the cross-sectional area being on a plane perpendicular to the axis of the main shaft 1. As a result, the rigidity (or spring constant) of the sleeve S is lower than that of the part P of the main shaft 1. Accordingly, the sleeve S is axially contracted or is elastically deformed along its axis upon tightening the loading nut 8 to provide the pre-load to the Belleville springs 7, so that the axial contraction amount of the sleeve S is larger than the axial elongation amount of the part P of the main shaft 1. For accomplishing the above purpose, the sleeve S may be formed of cast iron, copper, aluminum, brass, or a variety of alloys containing copper and aluminum, in place of steel. However, it is preferable that the sleeve S is formed of the same carbon steel as that of the main shaft 1 to obtain a predetermined hardness.

An annular cam flange 9 is rotatably mounted on the main shaft. A loading cam mechanism 10 is provided between the cam flange 9 and the input disc 2a.

With the above toroidal continuously variable transmission T, a rotational force is transmitted from an input shaft 11 to the cam flange 9 through a so-called forward and backward changing mechanism 12. The rotational force transmitted to the cam flange 9 is further transmitted through the loading cam mechanism 10. When relative rotation is made through the loading cam mechanism 10 between the cam flange 9 and the input disc 2a, the loading cam mechanism 10 produces a thrust for thrusting the input disc 2a toward the output disc 3a. A reaction force of the above thrust is input from the cam flange 9 to the other input disc 2b via a bearing 13, the main shaft 1, the loading nut 8 and the belleville springs 7, thereby producing a thrust directing to the output disc 3b. The thrusts (based on a transmitted torque from the input shaft 11) transmitted through the loading cam mechanism 10 to the input discs 2a, 2b cause each power roller 4a, 4b, 5a, 5b to be put between and brought into frictional engagement with the input and output discs 2a, 3a (2b, 3b) under pressure corresponding to the transmitted torque from the input shaft 11, thus transmitting power from the input shaft 11 to the output disc 3a, 3b.

It will be understood that the main shaft 1 may axially elongate or elastically deform along its axis when a large torque change is made during vehicle speed change, so that the part P of the main shaft 1 also elongates to increase the distance between the step section 1a of the main shaft 1 and the tip end of the cylindrical projection 8b of the loading nut 8. However, by virtue of the sleeve S which is in press contact with the step section 1a of the main shaft 1 in the contracted state, no space is produced between the main shaft step section 1a and the sleeve S so as to thereby prevent the loading nut 8 from being loosened, even though the main shaft 1 axially elongates.

Effects of the present invention will be discussed in detail in comparison with a conventional toroidal continuously variable transmission shown in FIG. 2.

Figure 2:
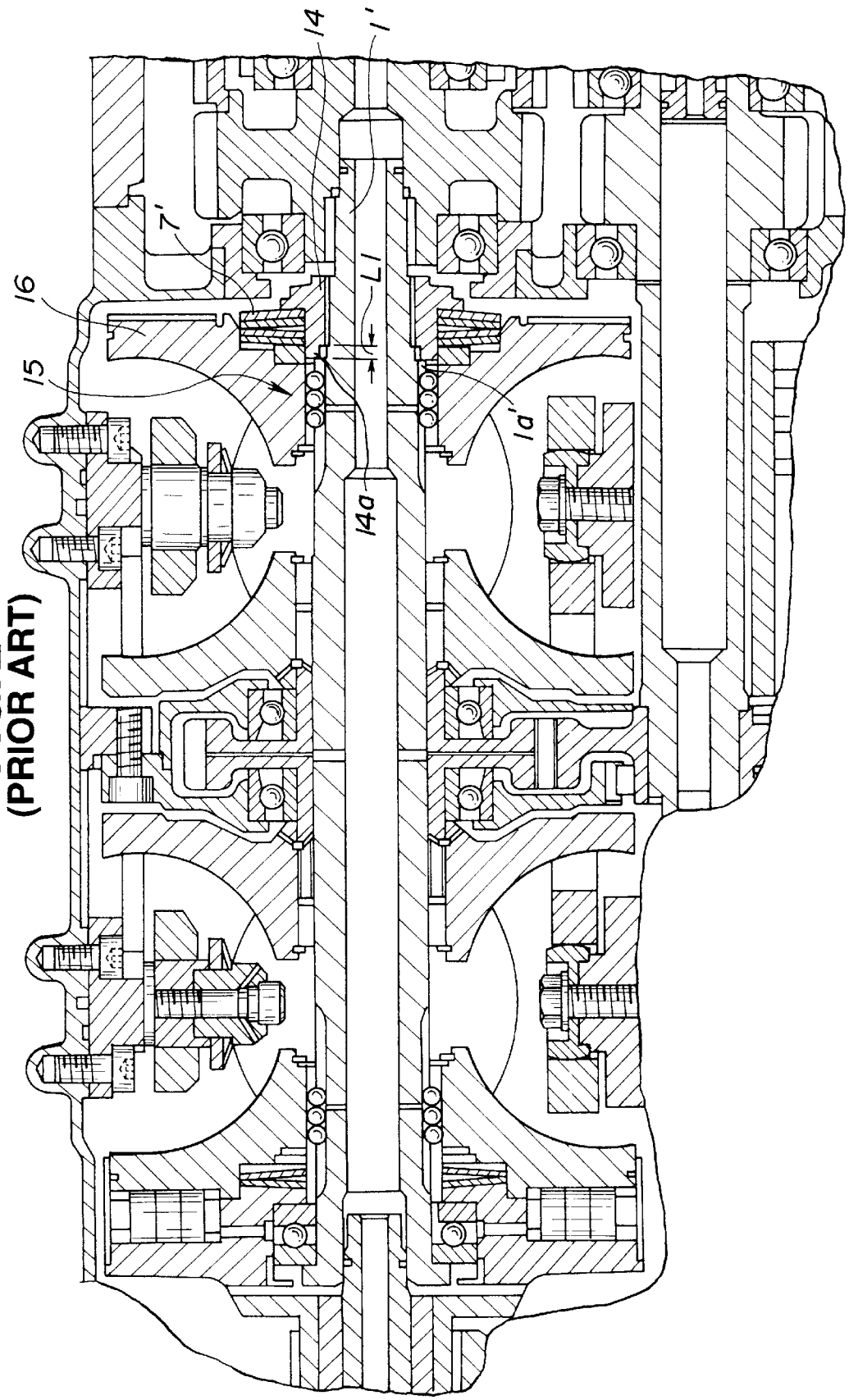
FIG. 2 is a fragmentary longitudinal sectional view of a conventional toroidal continuously variable transmission.

In the conventional toroidal continuously variable transmission shown in FIG. 2, a loading nut 14 screwed and fixed on a main shaft 1' to be brought into press contact with a step section 1a' of the main shaft 1' is higher in rigidity (or spring constant) and difficult to have a sufficient axial length of its internal threaded portion from the viewpoint of construction of the transmission. Additionally, it is also difficult that the length L1 of an abutting end section 14a of a loading nut 14 is sufficiently large to compensate the tightening force of the loading nut 14. Under such a situation, when relative rotation (in an amount corresponding to play of a ball spline 15 in the rotational direction) is made between an input disc 16 (corresponding to the input disc 2b in FIG. 1) and the loading nut 14 while the main shaft 1' axially elongates owing to a thrust under an input torque, the tip end of the abutting end section 14a of the loading nut 14 separates from the step section 1a' and therefore the loading nut will be loosened.

However, according to the toroidal continually variable transmission T of this embodiment, the thin and axially long sleeve S is disposed between the step section 1a of the main shaft 1 and the loading nut 8 under the contracted state so as to provide and compensate the pressure of the loading nut 8 against the step section 1a of the main shaft 1. Accordingly, the sufficient large distance L for providing the pressure against the main shaft step section 1a is obtained. In contrast, in the above conventional transmission, the corresponding distance L1 is considerably smaller than that L of the embodiment of the present invention. Additionally, the cross-sectional area of the cylindrical section S1 of the sleeve S is considerably smaller than that of the abutting end section 14a of the loading nut 14 and smaller than that of the part P of the main shaft 1. As a result, the rigidity (or spring constant) of the sleeve S is considerably lower than that of the abutting end section 14a of the loading nut 14 of the conventional transmission, so that the sleeve S can be set in position in the contracted state under a compressive force applied from the loading nut 8. Accordingly, if the main shaft 1 of the transmission T of this embodiment makes its elastic deformation and elongates upon receiving a large torque change during operation of the transmission T, the sleeve S in the contracted state makes its axial restoration so that no space is produced between the step section 1a of the main shaft 1 and the sleeve S to maintain a suitable pressure of the sleeve S against the annular flat surface of the main shaft step section 1a. Thus, the loading nut 8 can be effectively prevented from being loosened.

Furthermore, in the conventional toroidal continuously variable transmission shown in FIG. 2, during operation of the transmission, the belleville springs 7' make their axial sliding movement and contraction on the cylindrical section of the loading nut 14, in which the cylindrical section is subjected to a large amount of wear owing to sliding contact between it and the belleville springs 7'. In view of this, the peripheral surface portion of the cylindrical section of the loading nut 14 is usually hardened, for example, by carburizing. In making such a hardening processing to the loading nut 14, it is necessary to make a precise control in order to avoid a strength degradation (depending on hardening) of the internal thread portion of the loading nut 14, thereby complicating the production process of the loading nut 14.

However, according to the transmission T of this embodiment, it is sufficient to make a hardening process (such as carburizing) only on the sleeve S without making the hardening process on the loading nut 8. This simplifies the production process of a loading unit including the loading nut 8 and the sleeve S. In this regard, it is preferable that the outer peripheral surface portion of the sleeve S is subjected to a surface hardening treatment such as carburizing or a hardening in order to prevent the sleeve S from being worn under sliding contact with the inner peripheral portion of each belleville spring 7.

Besides, the sleeve S has the flange section S2 which extends radially inward to reach a position corresponding to the bottom of a groove for the balls of each ball spline Bs2, thereby enlarging the contacting area of the sleeve S to the main shaft step section 1a. This prevents the pressure of the sleeve S against the main shaft step section 1a from excessively increasing, thus avoiding plastic deformation of respective parts abutting to each other. Additionally, the internal thread portion of the loading nut 8 extends axially deeply inside the cylindrical section S1 of the sleeve S so as to increase the axial dimension thereof, thus further preventing the loading nut from being loosened.

Figure 3:
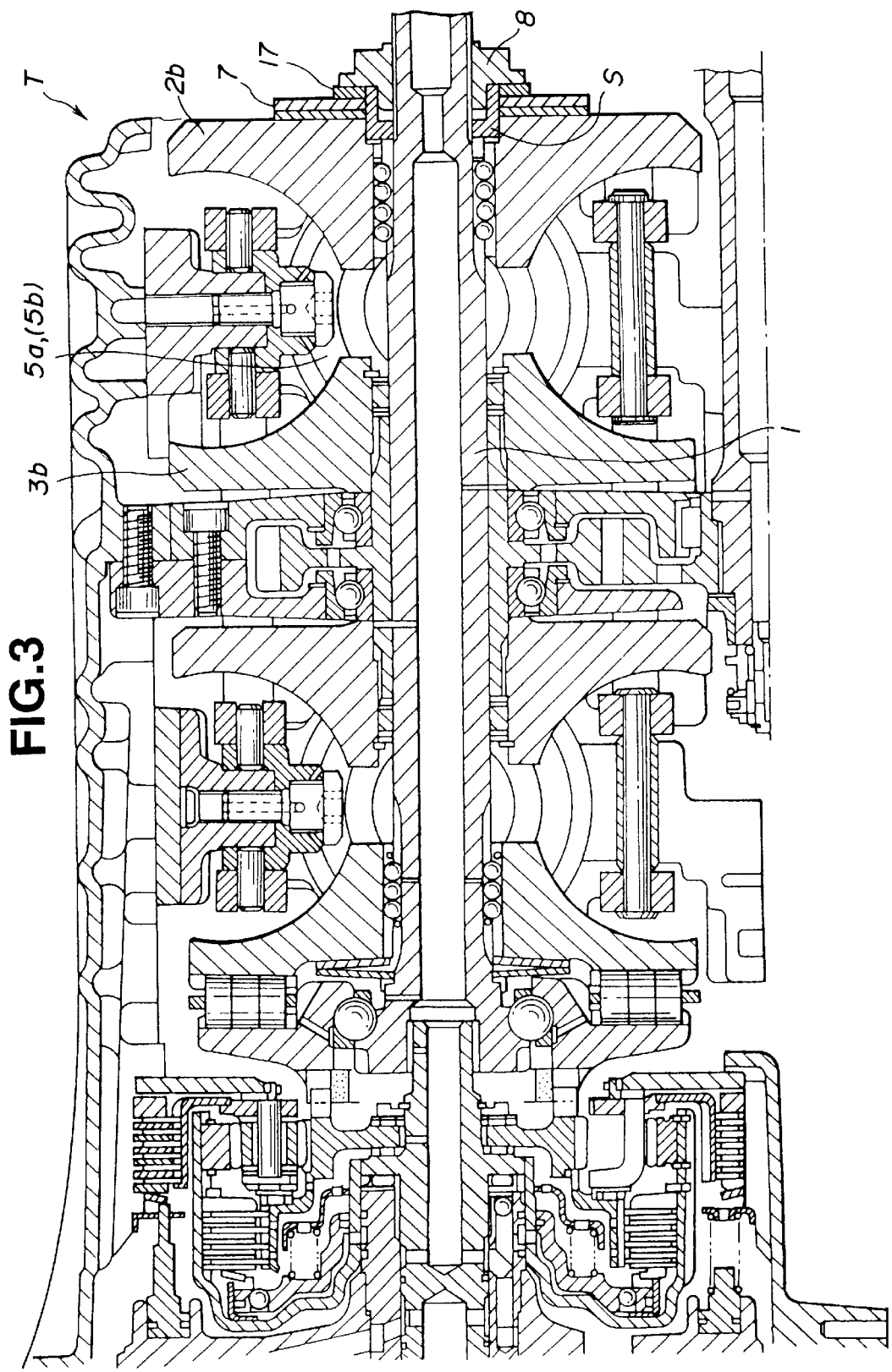
FIG. 3 is a fragmentary longitudinal sectional view of another embodiment of the toroidal continuously variable transmission according to the present invention.

FIG. 3 illustrates another embodiment of the toroidal continuously variable transmission T according to the present invention, similar to the embodiment of FIG. 1, in which the assembled state of the main shaft 1, the loading nut 8 and the sleeve S is the same as that of the embodiment of FIG. 1. In this embodiment, an annular shim 17 for adjusting preload to the belleville springs 7 is mounted on the cylindrical section S1 of the sleeve S and disposed between the annular flat face of the loading nut 8 and two belleville springs 7 which are in contact with the input disc 2b. It will be appreciated that the loading nut 8 can be effectively prevented from being loosened, as same as in the embodiment of FIG. 1.

Figure 4:
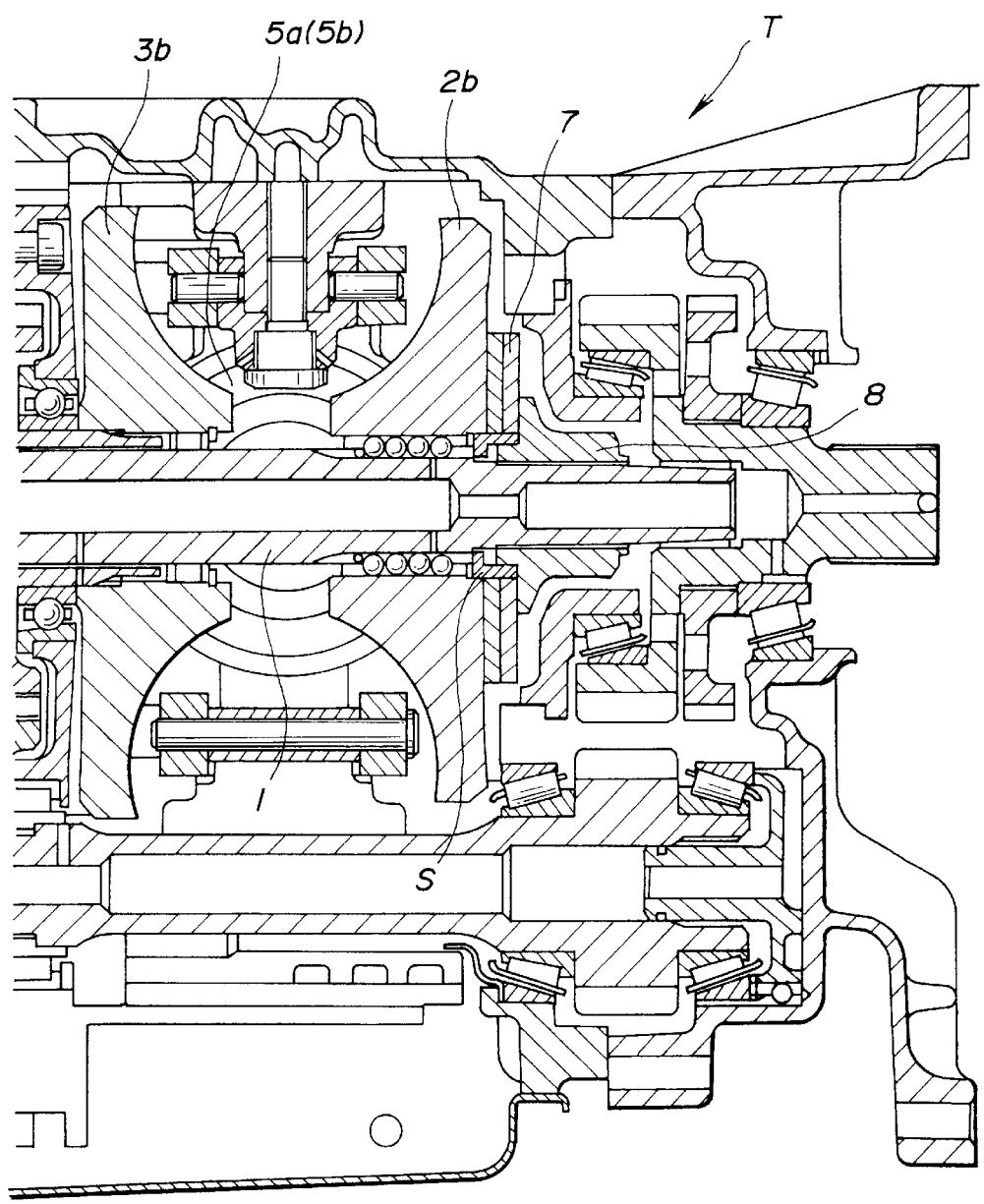
FIG. 4 is a fragmentary longitudinal sectional view of an essential part of a further embodiment of the toroidal continuously variable transmission.

FIG. 4 illustrates a further embodiment of the toroidal continuously variable transmission T according to the present invention, which is similar to the embodiment of FIG. 1, in which the assembled state of the main shaft 1, the loading nut 8 and the sleeve S is the same as that of the embodiment of FIG. 1. In this embodiment, the sleeve S is provided with the function of the spacer or the shim for adjusting the pre-load upon omitting the spacer and the shim, and the internal thread portion of the loading nut 8 is extended in an opposite direction of the cylindrical projection 8b or toward an output gear (no numeral). In this case, while it is required to precisely set the axial length of the sleeve S in order to secure the screwing amount of the loading nut 8 and the adjusting amount of the pre-load to the belleville springs 7, not only the number of parts of the transmission T can be reduced but also the input disc 2b is not required to be formed with a groove for insertion of the spacer, thereby making it possible to increase the thickness of the input disc 2. In case that the groove for insertion of the spacer is formed, the internal thread portion of the loading nut 8 can be extended also toward the input disc. Thus, strength of the component parts of the transmission T can be improved in any case.

While the double cavity type toroidal continuously variable transmissions T have been shown and described as the embodiments, it will be appreciated that the principle of the present invention may be applied to a variety of transmissions of the type wherein the fastening force of a nut is lowered under a thrust acting on a main shaft.

I claim:

1. A toroidal continuously variable transmission comprising:

a main shaft having a step section;

an input disc drivably supported on the main shaft and movable axially along an axis of the main shaft;

an output disc rotatably supported on the main shaft and located facing said input disc;

a power roller disposed between and in frictional engagement with said input disc and said output disc so as to make transmission of power from said input disc to said output disc;

belleville springs each having a center opening, said belleville springs being disposed around the main shaft and located at an opposite side of said input disc with respect to said output disc so as to press said input disc toward said output disc;

a loading nut screwed on the main shaft to restrict an expansion amount of the belleville springs, said loading nut axially facing the step section of said main shaft; and a sleeve disposed between said loading nut and the step section of the main shaft, said sleeve being separable from said loading nut, said sleeve being disposed around the main shaft and having a major part clear of the main shaft, said belleville springs abutting said sleeve in a manner that said sleeve passes through the central opening of each belleville spring.

2. The toroidal continuously variable transmission as claimed in claim 1, wherein said sleeve has an axial length which is larger than an axial length of a part of said main shaft between the step section and an axial end of said loading nut.

3. The toroidal continuously variable transmission as claimed in claim 1, wherein said sleeve has a section having a cross-sectional area which is smaller than a cross-sectional area of a part of said main shaft between the step section and an axial end of said loading nut, each cross-sectional area being on a plane perpendicular to the rotational axis of said main shaft.

4. The toroidal continuously variable transmission as claimed in claim 1, wherein said sleeve is formed of a metal material which is lower in rigidity than a metal material of said main shaft.

5. The toroidal continuously variable transmission as claimed in claim 1, wherein said main shaft includes a first section on which said input and output discs are supported, and a second section which is smaller in outer diameter than said first section, said loading nut and said sleeve being mounted on said second section, wherein the step section is formed at a border between said first and second sections, the step section having an annular face facing said loading nut.

6. The toroidal continuously variable transmission as claimed in claim 5, wherein said loading nut includes an annular main body section threadedly engaged on said second section of said main shaft, and a cylindrical projection which is integral and coaxial with said main body section, said cylindrical projection projecting toward the annular face of the step section and being smaller in outer diameter than said main body section.

7. The toroidal continuously variable transmission as claimed in claim 6, wherein said sleeve includes a cylindrical section coaxial with said main shaft and mounted on said cylindrical projection of said loading nut, said belleville springs being slidably mounted on an outer peripheral surface of said cylindrical section, and a flange section integral with said cylindrical section and extending radially inward to contact with an outer peripheral surface of said main shaft second section, said flange section being in press contact with the annular face of the step section, said flange section being separate from said cylindrical projection of said loading nut to form a space.

8. The toroidal continuously variable transmission as claimed in claim 7, wherein said sleeve has an axial length which is larger than an axial length of a part of said main shaft between the step section and an axial end of said loading nut.

9. The toroidal continuously variable transmission as claimed in claim 8, wherein said cylindrical projection of said loading nut is axially inserted into said cylindrical section of said sleeve so that a tip end thereof is located generally at the axially central part of said cylindrical section, wherein said loading nut is formed with an internal thread portion which extends throughout said main body section and said cylindrical projection.

10. The toroidal continuously variable transmission as claimed in claim 7, wherein said sleeve is formed of a metal material which is lower in rigidity than a metal material of said main shaft.

11. The toroidal continuously variable transmission as claimed in claim 7, wherein said cylindrical section of said sleeve has a cross-sectional area which is smaller than a cross-sectional area of a part of said main shaft between the step section and an axial end of said loading nut, each cross-sectional area being on a plane perpendicular to the rotational axis of said main shaft.

12. The toroidal continuously variable transmission as claimed in claim 1, wherein said sleeve has an outer peripheral surface portion on which said belleville springs are slidably mounted, at least said outer peripheral surface being hardened by a hardening treatment.

13. A toroidal continuously variable transmission comprising:

a main shaft having a step section;

an input disc drivably supported on the main shaft and movable axially along an axis of the main shaft;

an output disc rotatably supported on the main shaft and located facing said input disc;

a power roller disposed between and in frictional engagement with said input disc and said output disc so as to make transmission of power from said input disc to said output disc;

belleville springs each having a center opening, said belleville springs being disposed around the main shaft and located at an opposite side of said input disc with respect to said output disc so as to press said input disc toward said output disc;

a loading nut screwed on the main shaft to restrict an expansion amount of the belleville springs, said loading nut axially facing the step section of said main shaft; and a sleeve disposed between said loading nut and the step section of the main shaft and disposed around said main shaft, said sleeve being separable from said loading nut, said belleville springs abutting said sleeve in a manner that said sleeve passes through the central opening of each belleville spring, said sleeve having a flange section located around said main shaft and extending radially inward toward an outer peripheral surface of said main shaft, said flange section being in contact with the step section of said main shaft, and a cylindrical section integral and coaxial with said flange section, said cylindrical section being larger in axial length than said flange section and radially clear of the outer peripheral surface of said main shaft, said cylindrical section being in contact with said loading nut.

* * * * *